US012365587B2

(12) United States Patent
Paglieri et al.

(10) Patent No.: US 12,365,587 B2
(45) Date of Patent: *Jul. 22, 2025

(54) HYDROGEN PRODUCTION WITH MEMBRANE REACTOR

(71) Applicant: Saudi Arabian Oil Company, Dhahran (SA)

(72) Inventors: Stephen N. Paglieri, Dhahran (SA); Aadesh Harale, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,816

(22) Filed: Apr. 29, 2024

(65) Prior Publication Data

US 2024/0300813 A1 Sep. 12, 2024

Related U.S. Application Data

(62) Division of application No. 16/905,802, filed on Jun. 18, 2020, now Pat. No. 11,999,619.

(51) Int. Cl.
*C01B 3/38* (2006.01)
*B01D 53/22* (2006.01)
(Continued)

(52) U.S. Cl.
CPC ............ *C01B 3/384* (2013.01); *B01D 53/227* (2013.01); *B01D 53/228* (2013.01); *B01D 69/04* (2013.01); *B01D 71/02231* (2022.08); *B01J 19/0013* (2013.01); *B01J 19/2415* (2013.01); *B01J 19/2475* (2013.01); *C01B 3/505* (2013.01); *B01D 2053/223* (2013.01);
(Continued)

(58) Field of Classification Search
None
See application file for complete search history.

(56) References Cited

U.S. PATENT DOCUMENTS 978,576 A 12/1910 Goodell
2,614,066 A 10/1952 Cornell
(Continued)

FOREIGN PATENT DOCUMENTS

AU 2003286894 6/2004
AU 2005286952 3/2006
(Continued)

OTHER PUBLICATIONS

PCT International Search Report and Written Opinion in International Appln. No. PCT/US2021/024865, dated Jun. 28, 2021, 13 pages.
(Continued)

Primary Examiner — Youngsul Jeong
(74) Attorney, Agent, or Firm — Fish & Richardson P.C.

(57) ABSTRACT

A system and method for producing hydrogen, including providing hydrocarbon and steam into a vessel to a region external to a tubular membrane in the vessel. The method includes steam reforming the hydrocarbon in the vessel via reforming catalyst to generate hydrogen and carbon dioxide. The method includes diffusing the hydrogen through the tubular membrane into a bore of the tubular membrane, wherein the tubular membrane is hydrogen selective.

20 Claims, 5 Drawing Sheets

(51) Int. Cl.
  *B01D 69/04* (2006.01)
  *B01D 71/02* (2006.01)
  *B01J 19/00* (2006.01)
  *B01J 19/24* (2006.01)
  *C01B 3/50* (2006.01)

(52) U.S. Cl.
  CPC ............ B01J 2219/00135 (2013.01); C01B 2203/0233 (2013.01); C01B 2203/041 (2013.01); C01B 2203/085 (2013.01); C01B 2203/1241 (2013.01)

(56) References Cited

U.S. PATENT DOCUMENTS

| | | | |
|---|---|---|---|
| 2,910,426 A | 10/1959 | Gluesenkamp | |
| 3,278,268 A | 10/1966 | Pfefferle, Jr. | |
| 3,409,540 A | 11/1968 | Gould et al. | |
| 3,533,938 A | 10/1970 | Arnold | |
| 3,702,292 A | 11/1972 | Burich | |
| 3,726,789 A | 4/1973 | Kovach | |
| 3,755,143 A | 8/1973 | Hosoi et al. | |
| 3,856,659 A | 12/1974 | Owen | |
| 3,979,757 A | 9/1976 | Kilby et al. | |
| 4,090,949 A | 5/1978 | Owen et al. | |
| 4,134,824 A | 1/1979 | Kamm et al. | |
| 4,264,435 A | 4/1981 | Read, Jr. et al. | |
| 4,297,203 A | 10/1981 | Ford et al. | |
| 4,426,276 A | 1/1984 | Dean et al. | |
| 4,466,946 A | 8/1984 | Goddin, Jr. et al. | |
| 4,527,003 A | 7/1985 | Okamoto et al. | |
| 4,587,011 A | 5/1986 | Okamoto et al. | |
| 4,589,896 A | 5/1986 | Chen et al. | |
| 4,655,904 A | 4/1987 | Okamoto et al. | |
| 4,717,407 A | 1/1988 | Choe et al. | |
| 4,725,349 A | 2/1988 | Okamoto et al. | |
| 4,786,400 A | 11/1988 | Farnsworth | |
| 4,830,728 A | 5/1989 | Herbst et al. | |
| 4,981,676 A | 1/1991 | Minet et al. | |
| 4,992,160 A | 2/1991 | Long et al. | |
| 5,091,351 A | 2/1992 | Murakawa et al. | |
| 5,108,581 A | 4/1992 | Aldridge | |
| 5,229,102 A | 7/1993 | Minet et al. | |
| 5,366,712 A | 11/1994 | Violante | |
| 5,401,300 A | 3/1995 | Lokhandwala et al. | |
| 5,407,466 A | 4/1995 | Lokhandwala et al. | |
| 5,407,467 A | 4/1995 | Lokhandwala et al. | |
| 5,746,985 A | 5/1998 | Takahashi | |
| 5,837,032 A | 11/1998 | Moll et al. | |
| 5,861,137 A * | 1/1999 | Edlund | B01J 8/0496 |
| | | | 423/655 |
| 5,904,837 A | 5/1999 | Fujiyama | |
| 5,906,728 A | 5/1999 | Iaccino et al. | |
| 5,951,850 A | 9/1999 | Ino et al. | |
| 5,997,594 A | 12/1999 | Edlund et al. | |
| 6,033,555 A | 3/2000 | Chen et al. | |
| 6,119,606 A | 9/2000 | Clark | |
| 6,153,163 A | 11/2000 | Prasad | |
| 6,179,900 B1 | 1/2001 | Behling et al. | |
| 6,180,081 B1 | 1/2001 | Poschmann et al. | |
| 6,190,533 B1 | 2/2001 | Bradow et al. | |
| 6,210,562 B1 | 3/2001 | Xie et al. | |
| 6,274,032 B2 | 8/2001 | Hood et al. | |
| 6,293,979 B1 | 9/2001 | Choudhary et al. | |
| 6,296,686 B1 | 10/2001 | Prasad et al. | |
| 6,338,833 B1 | 1/2002 | Aasberg-Petersen | |
| 6,361,582 B1 | 3/2002 | Pinnau et al. | |
| 6,531,515 B2 | 3/2003 | Moore, Jr. et al. | |
| 6,656,346 B2 | 12/2003 | Ino et al. | |
| 6,743,961 B2 | 6/2004 | Powers | |
| 6,830,596 B2 | 12/2004 | Deckman et al. | |
| 6,896,717 B2 | 5/2005 | Pinnau et al. | |
| 6,960,235 B2 | 11/2005 | Morse et al. | |
| 6,979,757 B2 | 12/2005 | Powers | |
| 7,019,187 B2 | 3/2006 | Powers | |
| 7,022,165 B2 | 4/2006 | Paglieri et al. | |
| 7,025,941 B1 | 4/2006 | Autenrieth et al. | |
| 7,045,554 B2 | 5/2006 | Raje | |
| 7,132,042 B2 | 11/2006 | Genetti et al. | |
| 7,182,917 B2 | 2/2007 | Krueger | |
| 7,217,304 B2 | 5/2007 | Deckman et al. | |
| 7,323,148 B2 | 1/2008 | Shah et al. | |
| 7,353,982 B2 | 4/2008 | Li | |
| 7,374,664 B2 | 5/2008 | Powers | |
| 7,396,449 B2 | 7/2008 | Powers | |
| 7,404,889 B1 | 7/2008 | Powers | |
| 7,419,584 B2 | 9/2008 | Stell et al. | |
| 7,527,661 B2 | 5/2009 | Chellappa et al. | |
| 7,550,642 B2 | 6/2009 | Powers | |
| 7,642,292 B2 | 1/2010 | Severinsky | |
| 7,744,747 B2 | 6/2010 | Halsey | |
| 7,858,834 B2 | 12/2010 | Powers | |
| 7,871,457 B2 | 1/2011 | Shah et al. | |
| 7,959,897 B2 | 6/2011 | Cui et al. | |
| 7,972,498 B2 | 7/2011 | Buchanan et al. | |
| 7,973,087 B2 | 7/2011 | Kibby et al. | |
| 8,198,338 B2 | 6/2012 | Shulenberger et al. | |
| 8,518,151 B2 | 8/2013 | Tessier et al. | |
| 8,563,185 B2 | 10/2013 | Assink et al. | |
| 8,585,802 B2 | 11/2013 | Keller | |
| 8,597,383 B2 | 12/2013 | Pham et al. | |
| 8,726,983 B2 | 5/2014 | Khan | |
| 8,828,121 B1 | 9/2014 | He et al. | |
| 8,900,546 B2 | 12/2014 | Van De Graaf et al. | |
| 8,931,347 B2 | 1/2015 | Donzier et al. | |
| 9,085,497 B2 | 7/2015 | Jennings | |
| 9,096,806 B2 | 8/2015 | Abba et al. | |
| 9,138,718 B2 | 9/2015 | Li et al. | |
| 9,242,230 B2 | 1/2016 | Moon et al. | |
| 9,255,230 B2 | 2/2016 | Shafi et al. | |
| 9,279,088 B2 | 3/2016 | Shafi et al. | |
| 9,284,497 B2 | 3/2016 | Bourane et al. | |
| 9,284,502 B2 | 3/2016 | Bourane et al. | |
| 9,296,961 B2 | 3/2016 | Shafi et al. | |
| 9,328,035 B1 | 5/2016 | Kuhn et al. | |
| 9,493,350 B2 | 11/2016 | Morico et al. | |
| 9,752,080 B2 | 9/2017 | Christensen et al. | |
| 9,863,244 B2 | 1/2018 | Donzier et al. | |
| 9,952,192 B2 | 4/2018 | Donzier et al. | |
| 10,357,759 B2 | 7/2019 | D'Souza et al. | |
| 10,472,951 B2 | 11/2019 | Donzier et al. | |
| 10,527,751 B2 | 1/2020 | Donzier et al. | |
| 11,492,254 B2 * | 11/2022 | Harale | C01B 3/505 |
| 11,583,824 B2 * | 2/2023 | Harale | C01B 3/48 |
| 2002/0098394 A1 | 7/2002 | Keefer et al. | |
| 2003/0041519 A1 | 3/2003 | Maruko | |
| 2003/0129109 A1 | 7/2003 | Bronicki | |
| 2003/0172589 A1 | 9/2003 | Krueger | |
| 2004/0120889 A1 | 6/2004 | Shah et al. | |
| 2005/0045034 A1 | 3/2005 | Paglieri et al. | |
| 2005/0109037 A1 | 5/2005 | Deckman et al. | |
| 2005/0109821 A1 | 5/2005 | Li | |
| 2005/0211603 A1 | 9/2005 | Guillaume et al. | |
| 2005/0217479 A1 | 10/2005 | Hale et al. | |
| 2006/0013759 A1 | 1/2006 | Jiang et al. | |
| 2006/0057060 A1 | 3/2006 | Sun et al. | |
| 2006/0124445 A1 | 6/2006 | Labrecque et al. | |
| 2007/0157517 A1 | 6/2007 | Tsay et al. | |
| 2007/0180991 A1 | 8/2007 | Chellappa et al. | |
| 2008/0001645 A1 | 1/2008 | Kuroki | |
| 2008/0011644 A1 | 1/2008 | Dean et al. | |
| 2008/0011645 A1 | 1/2008 | Dean | |
| 2008/0019902 A1 | 1/2008 | Rei et al. | |
| 2008/0083648 A1 | 4/2008 | Bishop et al. | |
| 2008/0194900 A1 | 8/2008 | Bhirud | |
| 2008/0277314 A1 | 11/2008 | Halsey | |
| 2008/0283445 A1 | 11/2008 | Powers | |
| 2009/0050523 A1 | 2/2009 | Halsey | |
| 2009/0123364 A1 | 5/2009 | Forsyth et al. | |
| 2009/0155650 A1 * | 6/2009 | Cui | H01M 8/0662 |
| | | | 429/495 |
| 2010/0089795 A1 | 4/2010 | Fujiyama et al. | |
| 2010/0137458 A1 | 6/2010 | Erling | |
| 2010/0260657 A1 | 10/2010 | Niitsuma et al. | |
| 2011/0076225 A1 | 3/2011 | Shah et al. | |

(56) References Cited

U.S. PATENT DOCUMENTS

| | | |
|---|---|---|
| 2011/0083996 A1 | 4/2011 | Shafi et al. |
| 2011/0177410 A1 | 7/2011 | Assink et al. |
| 2011/0247500 A1 | 10/2011 | Akhras et al. |
| 2012/0111051 A1 | 5/2012 | Kulkarni et al. |
| 2012/0118011 A1 | 5/2012 | Terrien et al. |
| 2012/0168154 A1 | 7/2012 | Chinn et al. |
| 2012/0195824 A1 | 8/2012 | Van De Graaf et al. |
| 2012/0258037 A1 | 10/2012 | Pham et al. |
| 2012/0323059 A1 | 12/2012 | Liu et al. |
| 2013/0129610 A1 | 5/2013 | Kale |
| 2013/0156685 A1 | 6/2013 | Vauk et al. |
| 2013/0220884 A1 | 8/2013 | Bourane et al. |
| 2013/0233766 A1 | 9/2013 | Shafi et al. |
| 2013/0248419 A1 | 9/2013 | Abba |
| 2014/0170061 A1 | 6/2014 | Chaubey et al. |
| 2014/0363345 A1 | 12/2014 | Li et al. |
| 2015/0037246 A1 | 2/2015 | Morico et al. |
| 2015/0240717 A1 | 8/2015 | Starcher et al. |
| 2015/0290575 A1 | 10/2015 | Rothermel et al. |
| 2016/0214859 A1 | 6/2016 | Beltramini et al. |
| 2016/0264886 A1 | 9/2016 | Davydov |
| 2016/0325990 A1 | 11/2016 | Galloway |
| 2016/0340187 A1 | 11/2016 | Said et al. |
| 2017/0050845 A1 | 2/2017 | Lofberg et al. |
| 2018/0079643 A1 | 3/2018 | Mortensen et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0312767 A1 | 11/2018 | Al-Sayed et al. |
| 2018/0370796 A1 | 12/2018 | Mokheimer et al. |
| 2019/0003303 A1 | 1/2019 | Donzier et al. |
| 2019/0112535 A1 | 4/2019 | Kinzl et al. |
| 2019/0135624 A1 | 5/2019 | Mair |
| 2019/0376821 A1 | 12/2019 | Donzier et al. |
| 2021/0309515 A1 | 10/2021 | Younes et al. |
| 2021/0394152 A1 | 12/2021 | Harale et al. |
| 2021/0395083 A1 | 12/2021 | Harale et al. |
| 2021/0395085 A1 | 12/2021 | Paglieri et al. |

FOREIGN PATENT DOCUMENTS

| | | |
|---|---|---|
| AU | 2005287034 | 3/2006 |
| AU | 2010291148 | 3/2011 |
| AU | 2012243063 | 10/2012 |
| CA | 2458314 | 4/1999 |
| CA | 2580580 | 3/2006 |
| CA | 2580585 | 3/2006 |
| CA | 2547011 | 8/2008 |
| CA | 2414657 | 5/2011 |
| CA | 2938299 | 5/2015 |
| CN | 104098071 | 10/2014 |
| CN | 102482079 | 5/2016 |
| CN | 103596671 | 6/2016 |
| CN | 105197887 | 3/2017 |
| CN | 105776133 | 11/2017 |
| EP | 130933 | 9/1987 |
| EP | 684066 | 11/1995 |
| EP | 1024111 | 8/2000 |
| EP | 1294637 | 3/2003 |
| EP | 1789171 | 5/2007 |
| EP | 1789172 | 5/2007 |
| EP | 1829821 | 9/2007 |
| EP | 2035329 | 3/2009 |
| EP | 909804 | 9/2010 |
| EP | 2696966 | 2/2014 |
| EP | 2825503 | 1/2015 |
| EP | 2473441 | 8/2018 |
| FR | 2943657 | 3/2009 |
| JP | H06345405 | 12/1994 |
| JP | H09278403 | 10/1997 |
| JP | 2943657 | 8/1999 |
| JP | 2001348205 | 12/2001 |
| JP | 2004502623 | 1/2004 |
| JP | 2004249264 | 9/2004 |
| JP | 2004352528 | 12/2004 |
| JP | 2007190455 | 8/2007 |
| JP | 2008513337 | 5/2008 |
| JP | 2008513338 | 5/2008 |
| JP | 4381033 | 10/2009 |
| JP | 2010266155 | 11/2010 |
| JP | 2011195352 | 10/2011 |
| JP | 2011195387 | 10/2011 |
| JP | 2011206612 | 10/2011 |
| JP | 2013503807 | 2/2013 |
| JP | 5390448 | 10/2013 |
| JP | 5588581 | 8/2014 |
| JP | 2014519463 | 8/2014 |
| JP | 5611627 | 9/2014 |
| JP | 2014169222 | 9/2014 |
| JP | 6040701 | 12/2016 |
| JP | 6345406 | 6/2018 |
| NO | 200701530 | 4/2007 |
| NO | 200701532 | 6/2007 |
| TW | 200619136 | 6/2006 |
| TW | 200630158 | 9/2006 |
| WO | WO 2000009633 | 2/2000 |
| WO | WO 2001064577 | 9/2001 |
| WO | WO 2002002460 | 1/2002 |
| WO | WO 2002070402 | 9/2002 |
| WO | WO 2004041714 | 5/2004 |
| WO | WO 2005051590 | 6/2005 |
| WO | WO 2006034086 | 3/2006 |
| WO | WO 2006034100 | 3/2006 |
| WO | WO 2006034103 | 3/2006 |
| WO | WO 2006082933 | 8/2006 |
| WO | WO 2006097703 | 9/2006 |
| WO | WO 2007031713 | 3/2007 |
| WO | WO 2008000782 | 1/2008 |
| WO | WO 2009013455 | 1/2009 |
| WO | WO 2009073436 | 6/2009 |
| WO | WO 2010009077 | 1/2010 |
| WO | WO 2010009082 | 1/2010 |
| WO | WO 2010009089 | 1/2010 |
| WO | WO 2010109106 | 9/2010 |
| WO | WO 2010143783 | 12/2010 |
| WO | WO 2011026943 | 3/2011 |
| WO | WO 2012006429 | 1/2012 |
| WO | WO 2012142009 | 10/2012 |
| WO | WO 2012143096 | 10/2012 |
| WO | WO 2012158673 | 11/2012 |
| WO | WO 2013137720 | 9/2013 |
| WO | WO 2015128045 | 9/2013 |
| WO | WO 2015183200 | 12/2015 |
| WO | WO 2016207892 | 12/2016 |
| WO | WO 2018226617 | 12/2018 |
| ZA | 2012001141 | 10/2012 |

OTHER PUBLICATIONS

PCT International Search Report and Written Opinion in International Appln. No. PCT/US2021/036849, dated Sep. 13, 2021, 14 pages.

PCT International Search Report and Written Opinion in International Appln. No. PCT/US2021/036848, dated Sep. 13, 2021, 15 pages.

PCT International Search Report and Written Opinion in International Appln. No. PCT/US2021/036850, dated Sep. 13, 2021, 15 pages.

Abbassi et al., "Efficiency improvements in production profiling using ultracompact flow array sensing technology," Petrophysics, Aug. 2018, 59(4): 457-488.

Alvarez et al., "Ru—Ni catalyst in the combined dry-stream reforming of methane: the importance in the metal order addition," Topics in Catalysts, Jul. 2015, 59(2):303-313, 11 pages.

Amo et al., "Low-Quality Natural Gas Sulfur Removal/Recovery," Membrane Technology and Research, DOE Report DE-AC21-92MC28133-01, Jan. 29, 1998, 107 pages.

Aschoundong et al., "Silane Modification of Cellulose Acetate Dense Films as Materials for Acid Gas Removal Macromolecules," Macromolecules, vol. 46, No. 14, Jul. 9, 2013, 11 pages.

(56) References Cited

OTHER PUBLICATIONS

Belov et al., "Gas transport and free vol. in hexafluoropropylene polymers," Journal of Membrane Science, vol. 383, Nov. 2011, 8 pages.

Bernardo et al., "Gas transport properties of Pebax/room temperature ionic liquid gel membranes" Separation and Purification Technology vol. 97, Sep. 2012, 13 pages.

Bhide et al., "Hybrid processes for the removal of acid gases from natural gas," Journal of Membrane Science, vol. 140, Issue 1, Mar. 4, 1998, 2 pages, Abstract Only.

Boeltken et al., "Ultra-compact microstructured methane steam reformer with integrated Palladium membrane for on-site production of pure hydrogen: Experimental demonstration," International Journal of Hydrogen Energy, Elsevier Science Publishers, Jul. 2014, 39(31):18058-18068, 11 pages.

Chatterjee et al., "Poly(ether urethane) and poly(ether urethane urea) membranes with high $H_2S/CH_4$ selectivity," Journal of Membrane Science, vol. 135, No. 99, Nov. 1997, 8 pages.

Chen et al., "Hydrogen production from the steam reforming of liquid hydrocarbons in membrane reactor," Catalysis Today, Elsevier, Oct. 2006, 118(1-2):136-143, 8 pages.

Jansen et al., "On the unusual solvent and the effect on the gas transport in perfluorinated Hyflon AD Membranes," Journal of Membrane Science, vol. 287, Issue 1, Jan. 2007, 6 pages.

Kraftschik et al., "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refinding: Processsing, Operations & Maintenance, Apr. 2012, 14 pages.

Lockhart, "Sour oil and gas management: 3.3," vol. Lii/New Developments: Energy, Transport, Sustainability Encyclopedia of Hydrocarbons, 2007, 34 pages.

Lokhandwala et al., "Membrane separation of nitrogen from natural gas: A case study from membrane synthesis to commerical deployment," Journal of Membrane Science 346, Jan. 2010, 10 pages.

Merkel and Toy, "Comparison of Hydrogen Sulfide Transport Properties in Fluorinated and Nonfluorinated Polymers," Macromolecules, vol. 39, No. 22, Sep. 2006, 10 pages.

Mori et al., "Reactor configuration and concentration polarization in methane steam reforming by a membrane reactor with a highly hydrogen-permeable membrane," Industrial & Engineering Chemistry Research, Feb. 2007, 46(7): 1952-1958.

Oi et al., "Simulation and cost comparison of CO2 liquefaction," Energy Procedia, 2016, 86: 500-510.

Robeson, "The upper bound revisited," Journal of Membrane Science, vol. 320, Jul. 15, 2008, 11 pages.

Rohland et al., "Electrochemical hydrogen compressor," Electrochinnica Acta, 1998, 43(24):3841-3846, 6 pages.

Rufford et al., "The removal of CO2 and N2 from natural gas: A review of conventional and emerging process technologies," Journal of Petroleum Science and Engineering, vol. 94-95, Sep. 2012, 32 pages.

Wismann et al., "Electrified methane reforming: A compact approach to greener industrial hydrogen production," Science Magazine, May 2019, 364(6442): 756-759.

Xu et al., "An Improved CO2 Separation and Purification System Based on Cryogenic Separation and Distillation Theory," Energies ISSN 1996-1073, May 2014, 7: 3484-3502.

\* cited by examiner

HYDROGEN PRODUCTION WITH MEMBRANE REACTOR

CROSS-REFERENCE TO RELATED APPLICATION

This application is a divisional of and claims priority to U.S. patent application Ser. No. 16/905,802, filed on Jun. 18, 2020, the entire contents of which are incorporated by reference herein.

TECHNICAL FIELD

This disclosure relates to reforming of hydrocarbon to produce hydrogen.

BACKGROUND

Natural hydrogen is generally not found on Earth. Therefore, hydrogen is commercially produced. Hydrogen may be produced from fossil fuels. Hydrogen is produced by coal gasification, biomass gasification, water electrolysis, or the reforming or partial oxidation of natural gas or other hydrocarbons. The produced hydrogen can be a feedstock to chemical processes, such as fuel cells, ammonia production, aromatization, hydrodesulphurization, and the hydrogenation or hydrocracking of hydrocarbons.

The reforming of natural gas is the most prevalent source of hydrogen production. The reforming of natural gas to produce hydrogen can include steam reforming of natural gas. Bulk hydrogen is typically produced by the steam reforming of natural gas (methane). Conventional steam reforming includes heating the natural gas (e.g., to between 700° C. to 1100° C.) in the presence of steam and a nickel catalyst. This endothermic reaction generates carbon monoxide and hydrogen. The carbon monoxide gas can be subjected to a water-gas shift reaction to obtain additional hydrogen.

SUMMARY

An aspect relates to a method of producing hydrogen, including providing hydrocarbon and steam into a vessel to a region external to a tubular membrane in the vessel. The method includes steam reforming the hydrocarbon in the vessel via reforming catalyst to generate hydrogen and carbon dioxide. The method includes diffusing the hydrogen through the tubular membrane into a bore of the tubular membrane, wherein the tubular membrane is hydrogen selective. The method includes providing heat for the steam reforming with electrical resistive heaters disposed in the vessel, wherein the reforming catalyst is disposed on the electrical resistive heaters and on an inside surface of a wall of the vessel.

Another aspect relates to a hydrogen production system including a vessel having an inlet to receive hydrocarbon. The system includes a reforming catalyst to convert the hydrocarbon into a product gas comprising hydrogen and carbon dioxide, wherein the reforming catalyst is disposed on an inside surface of a wall of the vessel and disposed on multiple resistive heaters in the vessel. The system includes the multiple resistive heaters to heat the reforming catalyst and the hydrocarbon. The production system includes a tubular membrane that is hydrogen selective and disposed in the vessel to separate the hydrogen from the product gas into a bore of the tubular membrane. The system includes a conduit collection header to receive the hydrogen from the bore of the tubular membrane.

Yet another aspect is a catalytic membrane reactor for hydrogen production. The reactor includes a vessel having an inlet to receive hydrocarbon. The reactor has a reforming catalyst in the vessel to convert the hydrocarbon into a product gas including hydrogen and carbon dioxide. The reactor includes the multiple electrical resistive heaters to heat the reforming catalyst and to provide heat to fluid in the vessel. The reactor has multiple cylindrical membranes in the vessel that are hydrogen selective to separate permeate (including hydrogen) from the product gas via the permeate diffusing through a wall of each cylindrical membrane to a bore of each cylindrical membrane, wherein the bore of each cylindrical membrane is coupled to a conduit collection header, and wherein the conduit collection header is to receive the permeate from each bore.

The details of one or more implementations are set forth in the accompanying drawings and the description below. Other features and advantages will be apparent from the description and drawings, and from the claims.

DETAILED DESCRIPTION

A prevalent large-scale route to produce hydrogen is steam methane reforming (SMR) of natural gas at high temperature (e.g., 800° C. to 900° C.) and high pressure (e.g., 15 bar to 30 bar) via a nickel-based catalyst in alloy tubes in a furnace. The providing of heat to drive this reforming reaction (highly endothermic) can be problematic and lead to lower efficiency. Steam generation may be integrated with the furnace to increase overall thermal efficiency. The conventional SMR is typically optimized for large-scale hydrogen production and generally does not scale down effectively for small-scale hydrogen production.

The rate of the endothermic SMR reaction is often limited by external heat transfer into the reactor, which is why conventional industrial steam-methane reforming catalyst tubes are typically located inside large box furnaces fired by burning hydrocarbon fuels. These furnaces often consume at least a third of the feedstock (e.g., natural gas) making the process less efficient and resulting in the emission of relatively large amounts of carbon dioxide. Furthermore, the efficiency of the large-scale industrial SMR process depends on turning the waste heat from the furnace exhaust into steam for use in other areas of the plant or facility. Such makes the process less efficient when scaled down for applications that have no use for the waste heat that is generated. In this instance, the waste heat is dissipated, often with active cooling that consumes even more energy.

In contrast, some aspects of the present disclosure are directed to a catalytic membrane reactor with hydrogen selective membranes to produce hydrogen. These membranes may facilitate to increase both the yield and recovery of hydrogen from an equilibrium-limited reaction such as steam methane reforming. The provision of heat for the endothermic reforming reaction may be implemented with electrical heaters internal in the reactor and that are in proximity to the reforming catalyst. These internal electrical heaters may be in contact with the reforming catalyst that promotes the reforming reaction. The membrane reactor may operate at lower temperature and be compact compared to a conventional SMR system. Utilization of the hydrogen-selective membranes facilitates production of pure hydrogen and a concentrated capture-ready carbon dioxide stream ready for utilization or sequestration.

Figure 1:
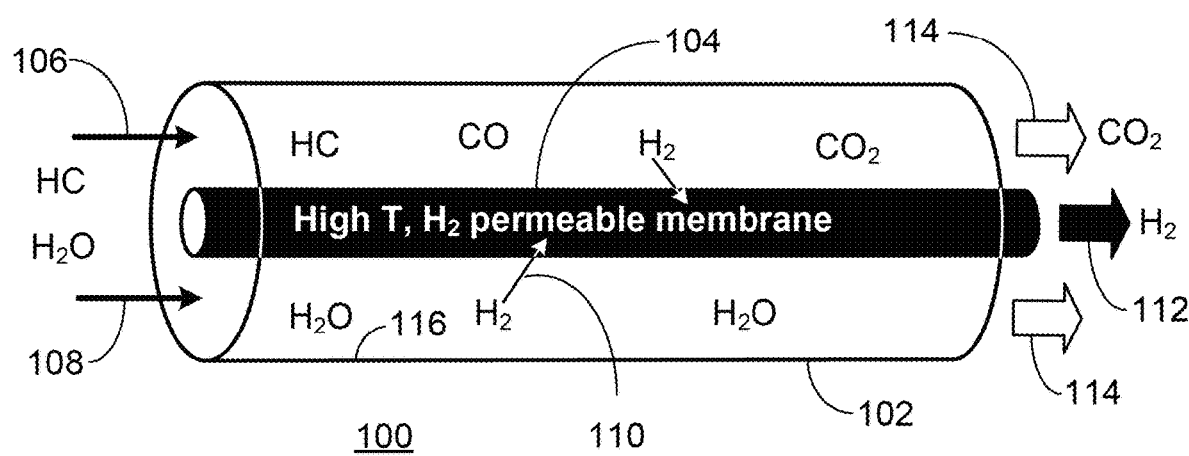
FIG. 1 is a simplified perspective view of a catalytic membrane reactor.

FIG. 1 is a simplified perspective view of a catalytic membrane reactor 100 including a vessel 102 and a hydrogen-selective tubular membrane 104 disposed in the vessel 102. The vessel 102 may be a cylindrical or tubular vessel. The vessel 102 may have a horizontal orientation (as depicted) or a vertical orientation.

In operation, hydrocarbon 106 and steam 108 are fed to the vessel 102. The hydrocarbon 106 is subjected to steam reforming in the vessel 102 to generate hydrogen and carbon dioxide (CO2) in the vessel 102. The steam reforming can involve the water gas-shift (WGS) reaction of carbon monoxide (CO) to CO2. The steam reforming reaction occurs in the region in the vessel 102 external to the tubular membrane 104. This region may be labeled as a reaction space and is the retentate side of the tubular membrane 104.

As the steam reforming reaction occurs and the hydrogen is being formed, the hydrogen diffuses 110 (permeates) through the tubular membrane 104 wall into the bore of the tubular membrane 104. The wall of the tubular membrane 104 is the membrane, i.e., the membrane material (e.g., palladium alloy). The bore is the interior space of the tubular membrane 104 and may be labeled as a lumen. The bore of the tubular membrane 104 is the permeate side of the tubular membrane 104.

Permeate 112 rich in hydrogen discharges from the bore of the tubular membrane 104 and from the reactor 100. The permeate 112 may be, for example, at least 90 mole percent (mol %) hydrogen. Retentate 114 rich in carbon dioxide (CO2) discharges from the reactor 100 from the vessel 102 region (reaction space) around and external to the tubular membrane 104. The CO2-rich retentate 114 on a dry basis may generally contain less than 10 mol % of the combination of hydrogen and CO. The CO2-rich retentate 114 may typically contain unreacted steam. The CO2-rich retentate 114 may generally be at least 90 mol % CO2 (dry basis) making the retentate 114 ready in certain instances for further compression for geological sequestration or enhanced oil recovery (EOR), or for further purification so the CO2 can be used as a feedstock for another process. The CO2-rich retentate 114 may be subjected to steam (water) removal before compression or further purification.

In embodiments, a sweep gas (e.g., steam or nitrogen) is provided to the bore of the tubular membrane 104 to flow through the bore to displace the permeate (hydrogen) from the bore and from the reactor 100. This displacement of hydrogen may maintain or increase driving force for hydrogen permeation through the tubular membrane 104 wall from the region (reaction space) external to tubular membrane 104 to the bore. In some embodiments, the sweep gas may be provided and flow in a countercurrent direction with respect to the feed of hydrocarbon 106 and steam 108. Thus, in those embodiments, the permeate 112 may discharge from the end (hydrocarbon-feed end) opposite the end that the retentate 114 discharges from the reactor 100.

Heat may be provided for the reforming reaction in the vessel 102 by electrical resistive heaters (not shown) disposed in the vessel 102. The resistive heaters disposed in the vessel 102 may be labeled as internal heaters. In some embodiments, the resistive heaters are electrical cartridge heaters.

Heat may also be provided for the reforming reaction by a heat source external to the vessel 102. For example, an electrical heater(s) (not shown) may be disposed on the external surface of the vessel 102. In another example, the vessel 102 may be disposed in a furnace to receive heat from the furnace as the external heat source.

An example operating temperature of the reactor 100 at which the reforming reaction may occur is less than 600° C., or about 550° C. or less. The operating pressure in the reaction space in the vessel 102 may be, for example, in the range of 10 bar to 50 bar or in the range of 30 bar to 40 bar, or at least 15 bar or at least 25 bar.

The reforming catalyst (not shown) for the steam reforming of the hydrocarbon 106 is disposed in the vessel 102. The reforming catalyst may be disposed on the internal resistive heaters. Thus, the internal resistive heaters (e.g., cartridge heaters) may readily and directly heat the reforming catalyst to promote and advance the reforming reaction.

The reforming catalyst may additionally be disposed on the internal surface 116 of the vessel 102 wall. In certain embodiments, the reforming catalyst is not in contact with the tubular membrane 104. The reforming catalyst may include catalyst that promotes the WGS reaction of CO to CO2.

The WGS reaction may occur in parallel with steam reforming to convert the CO that is formed into CO2. In implementations, the steam reforming and WGS reactions may include [1] $CH_4 + H_2O \Leftrightarrow 3H_2 + CO$ and [2] $CO + H_2O \Leftrightarrow CO_2 + H_2$ giving [3] overall reaction $CH_4 + 2H_2O \Leftrightarrow 4H_2 + CO_2$.

Figure 2:
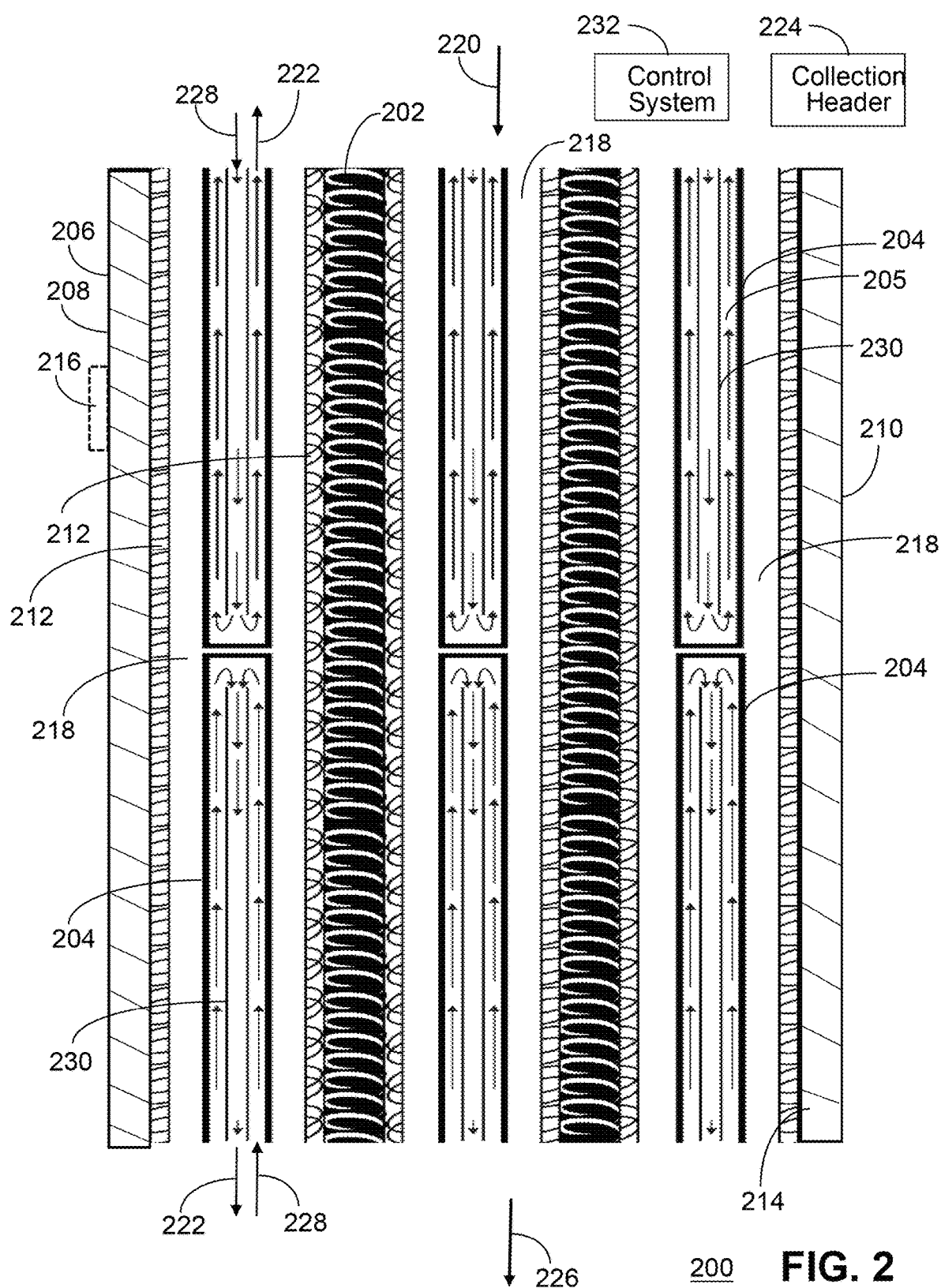
FIG. 2 is a simplified side-view representation of an electrically-heated catalytic membrane reactor with the vessel wall depicted as a cross-section.

FIG. 2 is a representation of an electrically-heated catalytic membrane reactor 200 with the vessel wall depicted as a cross-section. The reactor 200 may be a reformer to convert hydrocarbon to hydrogen and carbon dioxide. The catalytic membrane reactor 200 includes both electrical resistive heaters 202 and hydrogen-selective tubular membranes 204 in a vessel 206.

The electrical resistive heaters 202 may be interspersed inside the vessel 206. The reforming catalyst may be disposed on (in contact with) the resistive heaters 202, as discussed below. The resistive heaters 202 may provide heat directly to the reforming catalyst in the vessel 206. Heat may further travel by conduction and convection from the heaters 202 into fluid contents in the vessel 206 region external to the tubular membranes 204. The resistive heaters 202 may heat the reforming catalyst disposed on the resistive heaters to, for example, at least 550° C., at least 600° C., at least 700° C., or at least 800° C. The resistive heaters 202 may facilitate an operating temperature of the reactor 200 of at least 550° C. or at least 600° C.

Two electrical resistive heaters 202 are depicted in FIG. 2. While these two internal heaters are depicted as electrical resistive heaters, the internal heaters may instead each be a heater that relies on a heat transfer medium (heat transfer fluid). For instance, internal heaters may instead be a conduit through which the heat transfer medium (e.g., molten salt) is recirculated.

In the illustrated embodiment, the electrical resistive heaters 202 are generally cylindrical. The resistive heaters 202 may each be an electrical resistive wire heater. The resistive heaters 202 may be, for example, electrical cartridge heaters, electrical tubular heaters, etc.

Cartridge heaters are heating elements typically having a cylindrical shape. The cartridge heater (heating element) may include a sheath that is an outer metal enclosure (e.g., stainless steel). The cartridge heater (heating element) may include an insulator and a wire coil (as the heater) that is metal. The heater wire coil may be a metal alloy, such as an alloy of nickel and chromium, or other metal alloy. In operation, an alternating current may passed through the resistive wire coil inside the cartridge heater to generate resistive heating by the wire coil. This heat energy is transferred from the wire into the metal sheath and then the surrounding area via conduction. Cartridge heaters may heat the reforming catalyst 212 disposed on the cartridge heaters to at least 700° C. or at least 800° C. Cartridge heaters may provide for a reactor operating temperature up to 800° C. or greater, or at least 550° C. or at least 600° C. In operation, the reactor 200 operating temperature may be in a range of 450° C. to 650° C., or less than 700° C., less than 600° C., or less than 550° C.

The tubular membranes 204 may be characterized or labeled as cylindrical membranes, hollow membranes, and so on. The wall of the tubular membrane 204 is the membrane, i.e., the membrane material. The bore 205 of each tubular membrane 204 is the interior cylindrical cavity (lumen) of the tubular membrane 204 and defined by the wall (membrane or membrane material) of the tubular membrane 204. The material of the hydrogen-selective tubular membranes 204 may be, for example, a palladium alloy. The membrane can be a thin film of palladium alloy supported on a tubular porous substrate composed of a metal or metal oxide. In operation, hydrogen may pass through the tubular membrane 204 wall into the bore 205 (interior cavity or lumen) of the tubular membrane 204. The bore 205 of the tubular membrane 204 is the permeate side of the membrane 204. The permeate hydrogen may be collected as product from the bore 205. The vessel 206 volume space external to the tubular membranes 204 is the retentate side of the tubular membranes 204. The produced carbon dioxide may discharge from the vessel 206 from the retentate side.

As indicated, the vessel 206 houses the tubular membranes 204 and the resistive heaters 202. The vessel 206 may be, for example, stainless steel. The vessel 206 may be a cylindrical vessel. The vessel 206 may have a vertical orientation (as depicted) or a horizontal orientation. The vessel 206 wall 208 is depicted as a cross section. In the illustrated embodiment, the outside surface 210 of the vessel wall 208 is an external surface of the vessel 206 and thus is an external surface of the reactor 200 in this implementation.

Six hydrogen-selective tubular membranes 204 are depicted. Three tubular membranes 204 are in an upper portion of the vessel 206. Three tubular membranes 204 are in a lower portion of the vessel. In this embodiment, one end of each tubular membrane 204 is capped while the other end discharges permeated hydrogen for collection. The capped ends may generally be in a central or middle portion of the vessel 206 with respect to the vertical or longitudinal length of the vessel 206.

The tubular membranes 204 may be disposed adjacent to the resistive heaters 204 and/or adjacent the wall 208 of the vessel 206. In certain embodiments, the tubular membranes 204 share a longitudinal axis with each other and with the vessel 206, as depicted. For a vertical vessel 206, the vertical central axis of each tubular membrane 204 may be parallel with the vertical central axis of the vessel 206. For a horizontal vessel 206, the horizontal central axis of each tubular membrane 204 may be parallel with the horizontal central axis of the vessel 206.

In implementations, an upper tubular membrane 204 may be paired positionally with a lower tubular membrane 204. In particular, two tubular membranes 204 may be disposed or aligned axially (vertically for a vertical vessel 206) as a pair. Such a pair may generally run the majority of the longitudinal length of the vessel 206. The membranes 204 can also be staggered so the pairs do not align axially. Such may benefit mixing of the retentate and increase mass transfer of hydrogen into the membranes. The membranes 204 can also be different lengths with respect to each other. Each heater 202 may also consist of an upper and lower heater that are aligned axially as pairs or staggered. This can provide more flexibility in controlling the temperature inside the reactor 200. In some embodiments, the heat output of the heaters 202 may also be nonlinear along their length. For instance, less heat input may be implemented towards the reactor vessel 206 outlet where more of the exothermic WGS reaction occurs and less of the endothermic reforming reaction takes place.

The region (space, volume) around (external to) the tubular membranes 204 may be a reforming reaction space in the vessel 206. As indicated, this region (reforming reaction space) external to the tubular membranes 204 is on the retentate side of the tubular membranes 204. This region (reforming reaction space) can generally include most or all of the volume in the vessel (interior volume as defined by the vessel wall 208) that is external to the tubular membranes 204, external to the resistive heaters 202, and around any internals (e.g., piping) in the vessel 206.

The vessel 206 may have heads (not shown). The vessel 206 may have a head at the top of the vessel and a head at the bottom of the vessel. The heads may be, for example, a flat plate. The plate can be welded to the vessel wall 208, or the plate can be bolted (along with an intervening gasket) to the vessel wall 208. In other examples, the head is an elliptical head (see, e.g., FIG. 3) welded to the vessel wall 208.

The vessel 206 may be a pressure vessel. A pressure vessel may be designed and configured (e.g., with adequate wall thickness) to be subjected to an internal pressure up to a specified pressure (design pressure) greater than ambient pressure (atmospheric pressure). A pressure vessel may be rated to hold a material up to the design pressure. In operation, the operating pressure in a pressure vessel may generally be maintained less than the design pressure. A pressure vessel may be constructed per a formal standard or code, such as the American Society of Mechanical Engineers (ASME) Boiler & Pressure Vessel Code (BPVC) or the European Union (EU) Pressure Equipment Directive (PED).

The reforming catalyst 212 (e.g., nickel such as supported nickel) may be disposed on (in contact with) the resistive heaters 202. Thus, the resistive heaters 202 may more directly heat the catalyst 212 including by conduction via the contact and with less thermal resistance because the contact reduces thermal resistance. Conversely, a space or gap between catalyst (e.g., structured catalyst) and a heat source (e.g., resistive heaters) can significantly increase the heat transfer resistance.

The reforming catalyst 212 may be, for example, a nickel-based catalyst or a noble-metal based catalyst. Noble metal-based catalyst can be more active at lower temperatures. In some implementations, the catalyst 212 as pelletized catalyst can be packed inside the membrane reactor vessel 206 around the heaters 202 and the membranes 204 (the catalyst 212 may contact the membranes 204).

Reforming catalyst 212 may additionally be disposed on the inside surface 214 of the vessel wall 208. The reforming catalyst 212 may be coated on the resistive heaters 202 and on the vessel wall 208. In certain embodiments, the reforming catalyst 212 does not contact the tubular membranes 204. In implementations, the reforming catalyst 212 may be disposed in a structured form (e.g., in metal foam) on the resistive heaters 202 and on the vessel wall 208. The structured form may be, for example, the catalyst situated or coated on metal foam, mesh, or monoliths. The reforming catalyst 212 on the surface of the resistive heaters 202 and inside surface 214 of the vessel wall 208 may be in the form of pellets, granules, metal foam (or situated in the metal foam), or washcoat, and the like. A metal foam is generally a cellular structure consisting of a solid metal with pores. The pores may be, for example, 5 to 25 volume percent of the metal foam. The pores can be sealed (closed-cell foam) or interconnected (open-cell foam).

In implementations, the catalyst 212 generally does not come into direct contact with the membranes 204 so to avoid deactivation or scratching of the surface of the membrane 204 material by the catalyst 212 and thus promote longer lifetime of the membrane 204 material (e.g., palladium alloy). The gap between the catalyst 212 and the membranes 204 may be relatively small (short), e.g., 1 to 5 millimeters, so to advance or promote diffusion of the hydrogen (generated by the reforming reaction) through the tubular membrane 204 from the reaction space to the bore 205 of the tubular membrane 204.

In some embodiments, the reforming catalyst 212 (e.g., pelletized catalyst) as a packed catalyst may be packed in the vessel 206 in lieu of, or in addition to, the reforming catalyst 212 disposed directly on the surface of the resistive heaters 202 and inside surface 214 of the vessel wall 208. Such a packed catalyst may contact the tubular membranes 204 in certain implementations.

The reforming catalyst 212 may provide for WGS. However, in certain implementations, the catalyst 212 may include a layered catalyst with steam reforming catalyst and WGS reaction catalyst. If so, the WGS catalyst may be, for example, nickel-based or noble metal-based. With this layered catalyst (e.g. with WGS catalyst located towards the outlet region of the membrane reactor), the WGS has higher equilibrium conversion (and is a mildly exothermic reaction): $CH_4+H_2O=CO+3\ H_2$ and $CO+H_2O=CO_2+H_2$ giving overall reaction $CH_4+2H_2O=CO_2+4H_2$.

The steam reforming reaction (including any WGS reaction) occurs in the region (reaction space) discussed above. The description of steam reforming reaction in embodiments can be understood to include conversion of CO to $CO_2$.

The vessel wall 208 may optionally be heated by electrical heaters 216 disposed on the outside surface 210 of the vessel wall 208 or by combusting a fuel (e.g., via furnace) as an external heat source. The external electrical heaters 216 (if employed) or the furnace (if employed) may heat the vessel wall 208 that conducts heat directly to the reforming catalyst 212 disposed on the inside surface 214 of the vessel wall 208. The heat may further travel by conduction and convection into fluid contents (e.g., hydrocarbon, steam, product gas, etc.) in the region 218 (in the vessel 206) external to the tubular membranes 204. As discussed, this region 218 may be or provide a reaction space for the reforming reaction and is the retentate side of the tubular membranes 204.

The external electrical heaters 216 may be, for example, electrical band heaters, electrical strip heaters, electrical plate heaters, etc. Band heaters may be ring-shaped heaters that clamp around a cylindrical object, such as the cylindrical vessel 206. Heat transfer from band heaters to the vessel 206 generally occurs via conduction. The band heaters may clamp around the outer diameter of the vessel 206 and are an external heater that heats the vessel 206. Band heaters may be equipped with ceramic or mineral insulation to reduce heat loss to the environment.

The vessel 206 may have thermal insulation disposed on the outside surface 210 of the vessel wall 208. The thermal insulation may reduce heat transfer from the vessel 206 to the environment and thus conserve heat in the vessel 206. The thermal insulation may also provide for personnel protection.

In operation of the catalytic reforming reactor 200, a feed 220 is provided (e.g., via a conduit) to the vessel 206 to the region 218 (space) external to the tubular membranes 204. In operation, the region 218 is generally at a greater pressure than the bore 205 of the tubular membranes 204. The feed 220 may include steam and hydrocarbon. The hydrocarbon reacts with the steam in the region 218 via the reforming catalyst 212. This reaction may be steam reforming of the hydrocarbon.

The feed 220 may typically be feed gas or vapor but can include liquid (or supercritical fluid). To supply the feed 220 to the vessel 206, a feed conduit may route the feed 220 to the vessel 206 (e.g., to a nozzle on the feed vessel 206).

The feed 220 may be a mixture of steam and hydrocarbon. As for the ratio of hydrocarbon to steam, typical steam-to-carbon molar ratios may be, for example in a range of 1 to 6, a range of 1 to 5, or a range of 2.5 to 3.5. The mixture may be pressurized (greater than atmospheric pressure). In some implementations, the steam and hydrocarbon may be provided separately (e.g., via two respective conduits) to the vessel 206.

In particular implementations where feasible, baffles may be employed in the vessel 206 to promote mixing of the steam and hydrocarbon. However, baffles may generally be avoided (not implemented) in implementations. In some instances, baffles may not be readily installed due, for example, to space limitations. Also, the relatively close placement (position) of the reactor internal components (e.g., tubular membranes 204, resistive heaters 202, etc.) with respect to each other may provide for generating flow turbulence in the mixture of steam and hydrocarbon without use of baffles.

The hydrocarbon of the feed 220 may include, for example, natural gas, methane, liquefied petroleum gas (LPG), or a mixture of C1-C10, or any combinations thereof. The LPG may include, for example, propane and butane. The feed gas 220 hydrocarbon and steam reacts in the region 218 via the reforming catalyst 212 to generate a product gas including hydrogen and carbon dioxide.

The generated hydrogen is withdrawn from the region 218 (reaction space). For instance, the generated hydrogen diffuses (permeates) through the membranes 204 into the bore 205 of each tubular membrane 204. The bore 205 is the permeate side and lower pressure side of the tubular membranes 204. Permeate 222 (hydrogen-rich) having the diffused generated hydrogen may discharge from the bore 205 to a collection header 224 (as discussed below) for distribution or further processing. The permeate 222 may be, for example, at least 90 mol % hydrogen. The collection header can be a conduit or multiple conduits. When a sweep gas is used to displace the hydrogen from the bore 205 as discussed below, the permeate 222 may be at least 90 mol % hydrogen on a basis free of sweep gas. Thus, when the sweep gas is steam, the permeate 222 may be at least 90 mol % hydrogen on a dry basis.

The retentate 226 (rich in carbon dioxide) having the produced carbon dioxide may exit under pressure from the region 218 to discharge from the vessel 206. Again, the region 218 is on the retentate side of the tubular membranes 204, which may facilitate capture of the carbon dioxide. In the illustrated example, the retentate 226 discharges from a bottom portion of the vessel 206. The retentate 226 may discharge from the vessel 206 through a conduit. The retentate 226 may discharge through a nozzle on the vessel 206 and through a conduit coupled to the nozzle. The retentate 226 may have, for example, at least 90 mol % carbon dioxide on a dry basis.

A sweep gas 228 (such as steam or nitrogen) may be utilized to increase the driving force for hydrogen permeation through the membranes 204. Sweep gas 228 may be fed into the bore 205 (membrane lumen). The sweep gas 228 may displace permeate (hydrogen) from the bore 205 for collection.

In some instances, a tube 230 inside the membrane 204 tube (in the bore 205) may be utilized with respect to the sweep gas 228. Sweep gas 228 may flow countercurrent to the flow direction of the reactants (feed gas 220) to obtain greater driving force for hydrogen permeation.

The tube 230 may be labeled as an inner tube or insertion tube. The tube 230 may be positioned concentrically in the bore 205 (lumen) of the tubular membrane 204. Thus, an annulus may exist between the tube 230 and the wall (membrane) of the tubular membrane 204.

The sweep gas 228 may be fed to the vessel 206 via one or more conduits. The sweep gas 228 feed may be split (in the vessel 206 or external to the vessel 206) via a manifold, a supply header (e.g., with discharge subheaders), or multiple conduits as input to the respective tubular membranes 204.

In the example of FIG. 2, the sweep gas 228 for the three upper tubular membranes 204 is introduced into the tube 230. Thus, the sweep gas 228 exits the tube 230 at the capped-end portion of the tubular membrane 204 and flows upward through the annulus. The sweep gas 228 displaces the permeate (hydrogen) in the annulus (in the three upper membranes 204) in a direction countercurrent to flow of the reactants (feed gas 220). The permeate 222 discharged from the vessel 206 to the collection header 224 may include the sweep gas 228. The permeate 222 may flow to the collection header 224 via a conduit (and vessel 206 nozzle) coupling the vessel 206 (and annulus in the bore 205) to the collection header 228.

The sweep gas 228 for the three lower tubular membranes 204 is introduced into the annulus. For the three lower tubular membranes 204, the sweep gas 228 displaces permeate (hydrogen) in the annulus countercurrent to flow of the reactants (feed gas 220) into the vessel 206. The flowing of the sweep gas 228 through the annulus countercurrent to the flow of the retentate (as depicted) may generally increase the driving force for permeation of hydrogen through the membrane 204. The sweep gas 228 and permeate enter the tube 230 at the capped-end portion of the tubular membrane 204. Thus, the permeate 222 that discharges from the vessel 206 to the collection header 224 has sweep gas 228. The permeate 222 (having sweep gas 228 and generated hydrogen) discharges from the three lower membranes 204 via the respective tube 230 at the bottom portion of the vessel 206. Conduits may route the permeate 222 to the conduit collection header 224.

The presence of sweep gas 228 discharged in the permeate 222 reduces the percent hydrogen in the permeate 212. Yet, generally, the sweep gas 228 as steam may be readily removed from the permeate 212 downstream to give relatively pure hydrogen. For instance, the steam may be condensed in a heat exchanger and removed as liquid water.

The reactor 200 system may include a control system 232 that facilitates or directs operation of the reactor 200 system, such as the supply or discharge of flow streams (including flow rate), control of the heaters 202, 216, control of the reactor 200 operating temperature and operating pressure, and so on. The control system 232 may include a processor and memory storing code (e.g., logic, instructions, etc.) executed by the processor to perform calculations and direct operations of the reactor 200 system. The processor (hardware processor) may be one or more processors and each processor may have one or more cores. The processor(s) may include a microprocessor, central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware. The control system 232 may include a desktop computer, laptop computer, computer server, programmable logic controller (PLC), distributed computing system (DSC), controllers, actuators, or control cards. The control system 232 may be communicatively coupled to a remote computing system that performs calculations and provides direction. The control system 232 may receive user input or remote-computer input that specifies the set points of control devices or other control components in the reactor 200 system. In some implementations, the control system 232 may calculate or otherwise determine the set point of the control device.

Reactor operating temperature control with electrical heating may be implemented via the control system 232 or controller. Lower operating temperatures and employment of electrical heaters (compared to furnace heating) may allow for more inexpensive materials of construction (e.g., 300 series stainless steels) for the membrane reactor system. Electrical heating may provide for more precise temperature control and thus is beneficially more prone to prevent reactor components from exceeding design temperature or maximum operating temperature limits of the reactor components. Electrical heating may be more efficient (especially if the electricity is obtained from renewable sources) because energy is not wasted by venting hot flue gases as in instances of conventional SMR. In certain embodiments, renewable energy sources (e.g., solar, wind, etc.) may be utilized to reduce the cost of electricity supplied to the internal resistive heaters 202 (and external heaters 216 if employed). The supplying of heat directly inside the reactor (via internal resistive heaters) generally reduces conductive losses compared to external heating, such as via an external furnace. Thus, the electrically heated reactor may be well-suited for running endothermic reactions (such as steam methane reforming) that utilize large energy inputs to supply the heat of reaction.

Figure 3:
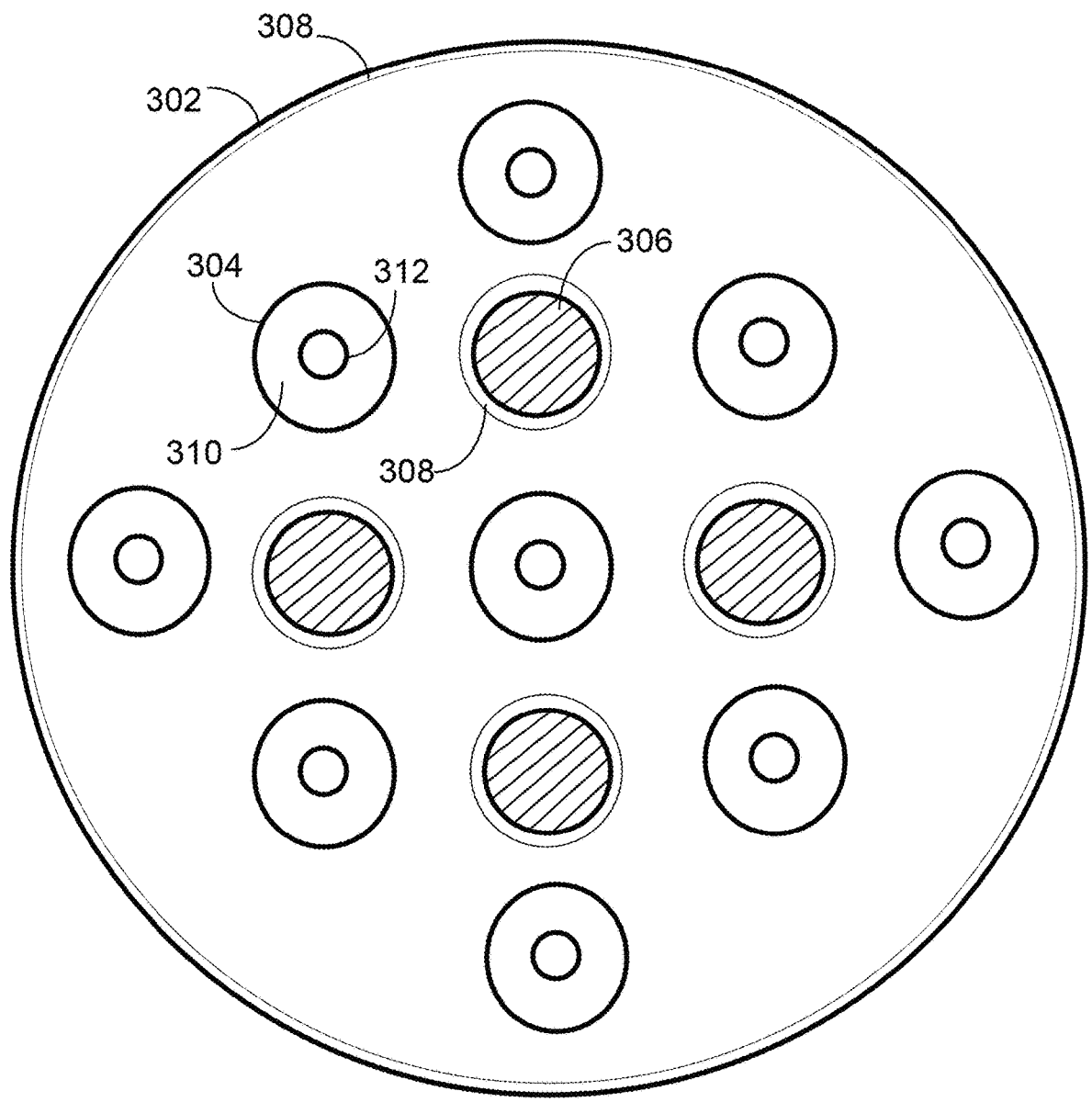
FIG. 3 is a simplified cross-section top view of a catalytic membrane reactor.

FIG. 3 is a simplified cross-section top view of a catalytic membrane reactor 300 for steam reforming hydrocarbon to generate hydrogen and carbon dioxide. The reactor 300 includes a vessel 302 that is a cylindrical vessel. The vessel 302 may be a vertical vessel or a horizontal vessel.

The reactor 300 includes tubular membranes 304 that are hydrogen selective. The tubular membranes 304 are disposed in the vessel 302. The membrane material of the tubular membranes may be, for example, a palladium alloy.

Nine tubular membranes 304 are depicted. In certain embodiments, two tubular membranes 304 may reside axially in alignment, one on top of the other (with adjacent end portions being capped). See, e.g., FIG. 2. Thus, in those embodiments, the reactor 300 includes eighteen tubular membranes 304.

In embodiments, the tubular membranes 304 share a longitudinal axis with each other and with the vessel 302, as depicted. For a vertical vessel 302, the vertical central axis of each tubular membrane 304 may be parallel with the vertical central axis of the vessel 302. For a horizontal vessel 302, the horizontal central axis of each tubular membrane 304 may be parallel with the horizontal central axis of the vessel 302.

The reactor 300 includes internal heaters 306 that are electrical resistive heaters disposed in the vessel 302. The resistive heaters 306 may be interspersed in the vessel 302 including to be spaced proportionally with respect to each other and/or with respect to respective tubular membranes 304. The resistive heaters 306 may be, for example, electrical cartridge heaters. In implementations, the resistive heaters 306 may generally run a majority of the longitudinal length of the vessel 306. The reactor 300 may include more tubular membranes 304 and more heaters 306, and/or the membranes 304 and heaters 306 may be positioned closer together (than depicted) for increased performance.

The width of the gap between the internal heaters 306 and the membranes 304 may be specified, for example, based on anticipated operating conditions (e.g., feed flow rate and composition, reactor operating temperature, etc.) so that the rate of reaction (e.g., hydrogen generation) may be balanced by the rate of hydrogen diffusion through the membranes 304. This rate of hydrogen diffusion can be influenced by the thickness of the gas diffusion boundary layer.

The catalytic membrane reactor 300 includes reforming catalyst 308 (e.g., nickel-based catalyst) disposed on the outer surface of electrical resistive heaters 306 and on the inside surface of the vessel 302 wall. The reforming catalyst may be a coating or structured form, as discussed with respect to FIG. 2.

Reticulated metal foam and wash coated catalysts generally have significantly greater thermal conductivity than conventional steam reforming catalysts composed of nickel deposited onto pelletized metal oxide supports. The catalyst 308 in metal foam attached directly to the resistive heaters 306 or the catalyst 308 wash coated on the resistive heaters 306 increases heat transfer to the catalyst. Such may also give more uniform heating of the reactor, which can reduce presence of cold spots and promote utilization of the catalyst 308 and membranes 304 more effectively. The presence of foam in the reaction space also increases turbulence, thereby enhancing the mass transfer of hydrogen to the surface of the membrane 304. The resistive heaters 306 in the reactor 300 vessel 302 may facilitate more precise control of temperature, which can be beneficial to optimizing or improving reactor performance including, for example, when the feed conditions change in response to the demand for hydrogen. Direct contact of the catalyst 308 with the internal resistive heaters 306 to provide efficient heat transfer may be a beneficial aspect of the reactor 300. Interspacing internal resistive heaters 306 in between the membranes 304 may generally provide heat directly to where beneficial to run the endothermic steam-reforming reaction.

In some embodiments, the reforming catalyst 308 (e.g., pelletized catalyst) as a packed catalyst may be packed in the vessel 302 in lieu of, or in addition to, the reforming catalyst 308 as disposed directly on the resistive heaters 306 and vessel 302 wall. Such a packed catalyst may contact the tubular membranes 304 in certain examples. Moreover, the reforming catalyst 308 may provide for WGS. The catalyst 308 may include a layered catalyst with steam reforming catalyst and WGS reaction catalyst.

In operation, the resistive heaters 302 heat the catalyst 308 disposed on (or adjacent to) the resistive heaters 302. The reactor 302 may also include external electrical heaters (e.g., band heaters) disposed on the outside surface of the vessel 302 to heat the vessel 302 wall and thus heat the catalyst 308 disposed at the inside surface of the vessel 302 wall.

In operation, hydrocarbon and steam are fed to the vessel 306. The hydrocarbon and steam are converted to hydrogen and carbon dioxide via the reforming catalyst 308 in a steam reforming reaction. The hydrocarbon reacts with the steam via the reforming catalyst 308 to generate hydrogen and carbon dioxide. Heat for the endothermic steam reforming reaction may be provided by the internal electrical resistive heaters 306 and by the external electrical heaters. The fluid contents in the vessel 302 may receive heat by conduction and convection. The reactor 300 operating temperature in the vessel 302 may be in a range of 450° C. to 650° C. The reactor 300 operating temperature may be less than 800° C., less than 750° C., less than 700° C., less than 600° C., or less than 550° C. Operating pressure may be, for example, in the range of 10 bar to 50 bar.

The steam reforming reaction may occur in a reaction space external to tubular membranes 304. Thus, the product gas including the hydrogen and carbon dioxide may be generated in this volumetric region of the vessel that is the reaction space. This region or reforming reaction space can include the space (volume) between the respective tubular membranes 304 and the space between the respective internal resistive heaters 306. This reforming-reaction space region may generally additionally include the space in between the tubular membranes 304 and the internal resistive heaters 302, in between the tubular membranes 304 and the vessel 302 wall, and in between the internal resistive heaters 306 and the vessel 302 wall.

The hydrogen generated by the steam reforming reaction diffuses from the product gas (in the reaction space) through the membrane material of the tubular membrane 304 into the bore 310 (lumen) of the tubular membrane 304. The bore 310 is the permeate side of the tubular membrane. The permeate including the permeated hydrogen may discharge from the bore 310 (and from the vessel 302), such as to a header (conduit) that routes the discharged permeate for collection as product. The concentration of hydrogen in the discharged permeate may be, for example, at least 90 mol % (e.g., on a dry basis). The discharged permeate may be processed to remove steam (water) in cases where a sweep gas that is steam is utilized for displacing permeate from the bore. The discharged permeate may also be subjected to processing (e.g., purification) to give a more purified hydrogen.

In a pilot-plant example, a single-tube membrane reactor gave greater than 90% conversion of methane to hydrogen at a reactor operating temperature in a range of 500° C. to 575° C. (e.g., about 550° C.). Addition of a second membrane in series inside the same reactor (downstream of the first membrane) can give a conversion of the methane to hydrogen approaching 100% (e.g., conversion of at least 98%, at least 99%, or at least 99.5%). Such is also beneficial in providing for further purification of the carbon dioxide in the retentate by extracting nearly all of the remaining hydrogen from the product gas.

As discussed, a sweep gas may be provided to the bore 310 to facilitate displacement of the permeated hydrogen from the bore 310 (and from the vessel 302). The sweep gas displacing the permeated hydrogen from the bore 310 may maintain or increase the driving force for permeation (diffusion) of the generated hydrogen from the product gas in the reaction space through the membrane to the bore 310. The sweep gas flow in displacing permeate (primarily hydrogen) may be in a counter current direction to introduction of the hydrocarbon and steam into the reaction space in the vessel 302. The displaced permeate along with the sweep gas may discharge from the bore 310 to the collection header. In some embodiments, the sweep gas (e.g., nitrogen or steam) may be readily separated from permeate or permeate hydrogen.

In certain implementations, an inner tube 312 (e.g., analogous to the tube 230 in FIG. 2) in the bore 310 facilitates the routing and flow of the sweep gas (and associated displacement of permeate) in the bore.

The region (reaction space) external to the tubular membranes 304 is the retentate side of the tubular membranes 304. The carbon dioxide generated in the steam reforming reaction may discharge as retentate from the reaction space from the vessel 302.

Figure 4:
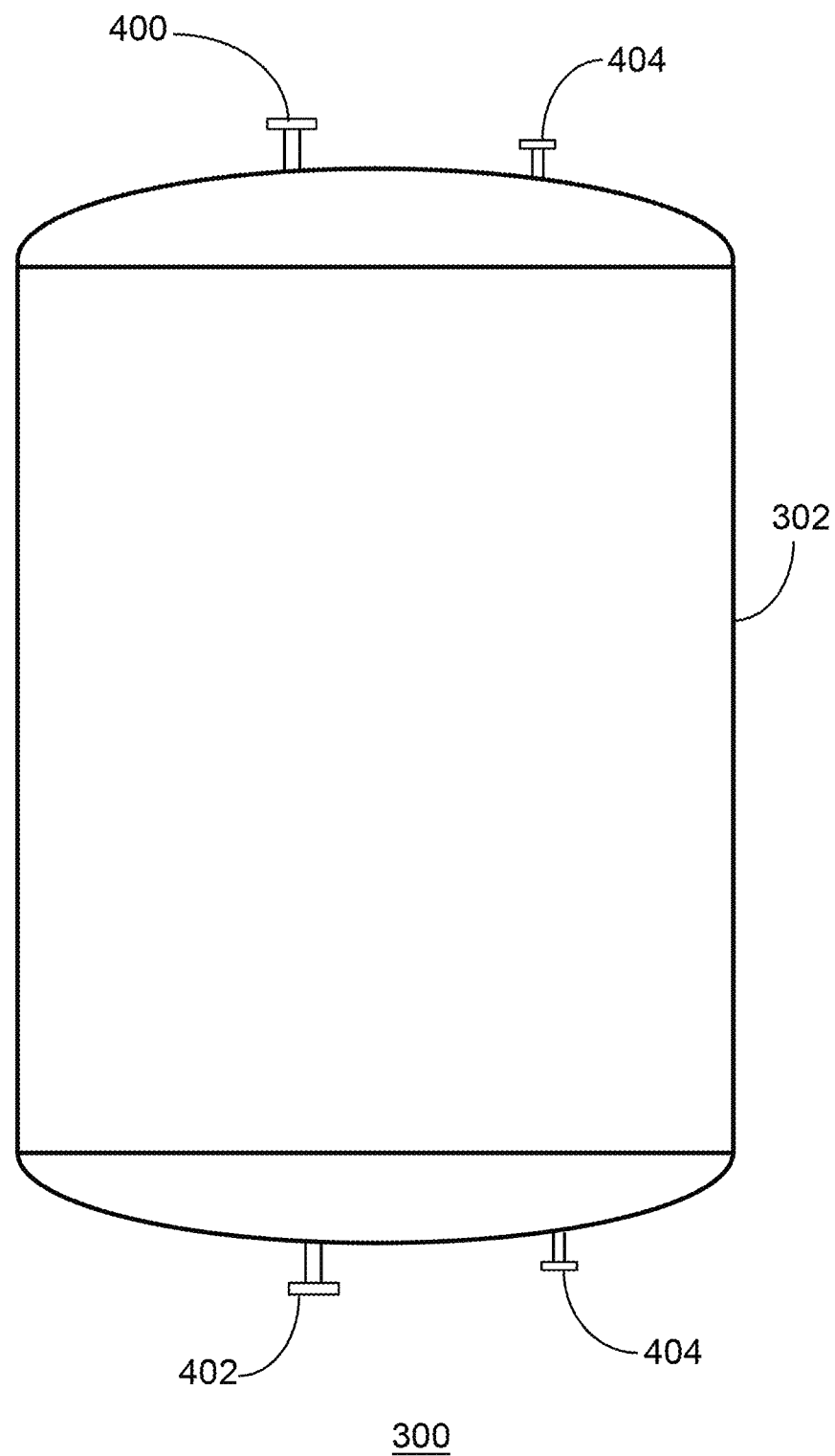
FIG. 4 is side perspective view of an embodiment of the catalytic membrane reactor of FIG. 3.

FIG. 4 is an embodiment of the reactor 300 having the vessel 302 as a vertical vessel with elliptical heads. A feed nozzle 400 at the top portion of the vessel 302 is an inlet for feed gas as a mixture of hydrocarbon and steam. A retentate nozzle 402 at a bottom portion of the vessel 302 is an outlet for discharge of retentate (primarily carbon dioxide) from the vessel 302.

A permeate nozzle 404 at the top portion of the vessel 302 is an outlet for discharge of permeate (primarily hydrogen) from the vessel 302 from membranes 304 in an upper portion of the vessel 302. A permeate nozzle 404 at the top portion of the vessel 302 is an outlet for discharge of permeate (primarily hydrogen) from the vessel 302 from membranes 304 in a lower portion of the vessel 302. Permeate discharged from the nozzles 402 may be routed via conduits to a conduit collection header.

While one permeate (hydrogen) nozzle 402 is depicted at the top portion and one permeate (hydrogen) nozzle 404 is depicted at the bottom portion, there may be multiple permeate (hydrogen) nozzles 402 at the top portion and the bottom portion. Such may depend on the routing of permeate discharged from the respective bores of the tubular membranes in the vessel 302. In one example, the vessel 302 includes a respective permeate nozzle 402 for each tubular membrane. Thus, in that example and with the number of tubular membranes indicated in FIG. 2, there are nine permeate nozzles 402 at the top portion of the vessel 302 and nine permeate nozzles 402 at the bottom portion of the vessel 302.

For coupling to respective external conduits, the nozzles 400, 402, 404 may be flanged (as depicted) or each have a screwed connection, and so forth. Further, there may be additional nozzles on the vessel 302, such as for introduction of sweep gas, for instrumentation (e.g., pressure sensors or gauges, temperature sensors or gauges, etc.), and the like.

Figure 5:
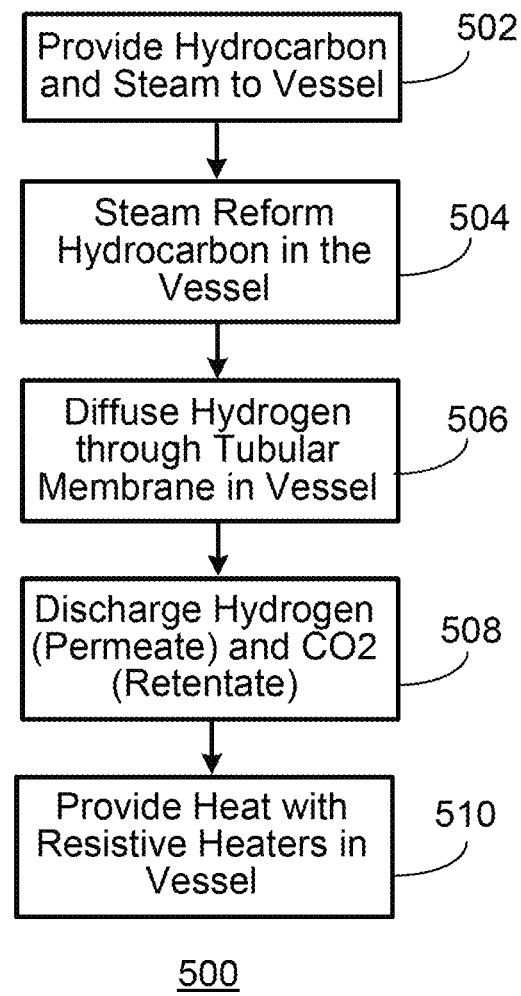
FIG. 5 is a method of producing hydrogen with a catalytic membrane reactor.

FIG. 5 is a method 500 of producing hydrogen with a catalytic membrane reactor via steam reforming. The catalytic membrane includes a vessel housing a hydrogen-selective tubular membrane and internal electrical resistive heaters. The vessel may be, for example, a cylindrical pressure vessel. There may be more than one hydrogen-selective tubular membrane in the vessel.

At block 502, the method includes providing hydrocarbon and steam into the vessel to a region external to the tubular membrane in the vessel. This region in the vessel may be characterized as a reaction space and the retentate side of the tubular membrane. The hydrocarbon may include natural gas, methane, LPG, or a mixture of C1 to C10 hydrocarbons, or any combinations thereof.

At block 504, the method includes steam reforming the hydrocarbon in the vessel via the steam and reforming catalyst (e.g., a nickel-based catalyst) in the vessel to generate hydrogen and carbon dioxide. The steam reforming converts the steam and hydrocarbon to hydrogen and carbon dioxide. The steam reforming may generally involve reaction of the hydrocarbon with the steam via the reforming catalyst. In embodiments, the reforming catalyst is not in contact with the tubular membrane or tubular membranes.

At block 506, the method includes diffusing the generated hydrogen through the tubular membrane into a bore of the tubular membrane. As indicated, the tubular membrane is hydrogen selective. The bore is the permeate side of the tubular membrane. For the case of multiple tubular membranes in the vessel, the generated hydrogen diffuses (permeates) through the membrane material to the respective bores of the multiple tubular membranes. There may be multiple tubular membranes in the reactor vessel, wherein each tubular membrane is hydrogen selective and has a respective bore that is the permeate side of the respective tubular membrane.

At block 508, the method includes discharging permeate (having the hydrogen) from the bore of the tubular membrane and from the reactor. The discharging of the hydrogen may involve discharging the hydrogen from the bore of the tubular membrane as permeate to a conduit for collection of the hydrogen or permeate that is hydrogen rich. The hydrogen content of the permeate on a dry basis may be at least 85 mol %, at least 90 mol %, or at least 95 mol %.

The method may include providing a sweep gas (e.g., steam or nitrogen) to the bore to displace the hydrogen (permeate) from the bore with the sweep gas and thus increase driving force for hydrogen permeation through the tubular membrane to the bore from the region external to tubular membrane. The sweep gas in displacing the hydrogen may flow in a countercurrent direction relative to flow of the hydrocarbon and the steam into the vessel.

At block 508, the method also includes discharging retentate (having the generated carbon dioxide) from the reaction space (retentate side) external to the tubular membrane(s). The retentate is generally rich in carbon dioxide. The retentate may have at least 90 mol % carbon dioxide on a dry basis. The method may include discharging the carbon dioxide as retentate from the vessel from a region external to the tubular membrane. The region may generally be a reaction space in the vessel and a retentate side of the tubular membrane.

At block 510, the method includes providing heat for the steam reforming with electrical resistive heaters (e.g., electrical cartridge heaters) disposed in the vessel. The reforming catalyst is disposed on the electrical resistive heaters and on an inside surface of a wall of the vessel of the reactor. The providing of the heat generally involves heating via the electrical resistive heaters the reforming catalyst disposed on the electrical resistive heaters. The providing of the heat may involve heating the hydrocarbon in the vessel via conduction and convection of heat from the electrical resistive heaters. The method may include heating, via a heat source external to the vessel, the wall of the vessel and the reforming catalyst disposed on the inside surface of the wall of the vessel. The external heat source may be an external electrical heater (e.g., band heater) disposed on an outside surface of the wall of the vessel. The method may include providing heat for the steam reforming via an electrical heater(s) disposed on an outside surface of the wall of the vessel.

Examples of the present catalytic membrane reactor may combine unit operations via process intensification and address distributed production of hydrogen. The membrane reactor may provide for efficiency via structured catalyst and electrical heating. The internal resistive heaters may supply heat directly to catalyst (e.g., metal foam or washcoated catalyst) inside the reactor, and with the contact of the resistive heater with the catalyst reducing thermal resistance of the heat transfer.

The techniques may facilitate the generation of relatively pure streams (e.g., each >95 mol %) of hydrogen and carbon dioxide produced in a single unit operation, which can save on both capital expenditures and operating expenditures in comparison to conventional systems. Hydrogen-selective membranes in series in the reactor may further increase both methane conversion and hydrogen recovery. Increased hydrogen recovery may further purify CO2 in the retentate stream.

The conventional SMR process is generally inefficient when scaled down. In contrast, present embodiments may be efficient with a smaller footprint. Hydrogen produced in a large and centralized conventional SMR plant can be relatively inexpensive. Yet, the transporting and storing of the hydrogen is typically expensive due to low density of the hydrogen and the use of specialized trucks (tube trailers) and tanks (high-pressure carbon fiber-reinforced vessels).

Some present embodiments may facilitate hydrogen to be produced where needed and with liquid hydrocarbons as feed in which transport is less expensive than hydrogen transport. Certain implementations may be compact systems for onsite generation of hydrogen from hydrocarbon feedstocks. One application is onsite hydrogen production at fueling stations, and with the feed including liquid fuels. Some embodiments can generate reasonably pure hydrogen onsite for mobility applications. Applications can include portable hydrogen generators in some embodiments.

Examples of the present membrane reactor (that reforms hydrocarbon feedstocks) can be heated without generating carbon dioxide to provide for the heating. The CO2 that is generated in the reforming reaction can be relatively pure and under pressure. Embodiments provide for producing hydrogen from hydrocarbons and simultaneously capturing CO2 which can reduce CO2 emissions and the CO2 footprint of a facility. The concentrated and pressurized CO2 stream resulting from embodiments of the membrane reactor can facilitate CO2 capture for sequestration, enhanced oil recovery (EOR), or use as a feedstock, and so on.

While the present discussion is focused on steam reforming, the membrane reactor can be configured for hydrocarbon reforming reactions that use air, oxygen, steam, or carbon dioxide. Further, certain configurations of the membrane reactor may be utilized for hydrogenating or dehydrogenating hydrocarbon over a catalyst. In another example, the membrane reactor may also be employed in endothermic ammonia decomposition over a catalyst to form a mixture of hydrogen and nitrogen.

An embodiment is a method of producing hydrogen that includes providing hydrocarbon and steam into a vessel (e.g., a cylindrical pressure vessel) to a region external to a tubular membrane in the vessel, and steam reforming the hydrocarbon in the vessel via reforming catalyst to generate hydrogen and carbon dioxide. The hydrocarbon may include, for example, natural gas, methane, liquid petroleum gas (LPG), or a mixture of C1 to C10 hydrocarbons, or any combinations thereof. The region external to the tubular membrane may be a reaction space in the vessel and a retentate side of the tubular membrane. In certain implementations, the reforming catalyst is not in contact with the tubular membrane. The method includes diffusing the hydrogen through the tubular membrane (hydrogen selective) into a bore of the tubular membrane, and discharging the hydrogen from the bore (e.g., permeate side of tubular membrane) as permeate (e.g., at least 90 mol % hydrogen on a dry basis) to a conduit for collection of the hydrogen. The method may include discharging the carbon dioxide as retentate (e.g., at least 90 mol % carbon dioxide on a dry basis) from the vessel. The method may include providing a sweep gas (e.g., steam or nitrogen) to the bore, displacing the hydrogen from the bore with the sweep gas, and increasing driving force for hydrogen permeation through the tubular membrane to the bore from the region external to tubular membrane via displacing the hydrogen from the bore with the sweep gas. In implementations, the sweep gas in displacing the hydrogen, flows in a countercurrent direction relative to flow of the hydrocarbon and the steam into the vessel. There may be multiple tubular membranes in the vessel that are hydrogen selective and having a respective bore that is the permeate side of the respective tubular membrane.

The method includes providing heat for the steam reforming with electrical resistive heaters (e.g., electrical cartridge heaters) disposed in the vessel. The reforming catalyst may be disposed on the electrical resistive heaters and on an inside surface of a wall of the vessel. The providing of the heat may include heating, via the electrical resistive heaters, the reforming catalyst disposed on the electrical resistive heaters. The providing of the heat may include heating the hydrocarbon via conduction and convection of heat from the electrical resistive heaters. The method may include providing heat for the steam reforming via an electrical heater disposed on an outside surface of the wall of the vessel. The method may include heating, via a heat source external to the vessel, the wall of the vessel and the reforming catalyst disposed on the inside surface of the wall of the vessel. In implementations, the heat source may be an electrical heater disposed on an outside surface of the wall of the vessel.

Another embodiment is a hydrogen production system including a vessel having an inlet to receive hydrocarbon. The system includes a reforming catalyst to convert the hydrocarbon into a product gas including hydrogen and carbon dioxide, wherein the reforming catalyst is disposed on an inside surface of a wall of the vessel and disposed on multiple resistive heaters in the vessel. The multiple resistive heaters (e.g., electrical cartridge heaters) in the vessel are to heat the reforming catalyst and the hydrocarbon in the vessel. A hydrogen-selective tubular membrane (e.g., palladium or a palladium alloy) is disposed in the vessel to separate the hydrogen from the product gas into a bore of the tubular membrane. The system includes a conduit collection header to receive the hydrogen from the bore of the tubular membrane. A conduit may couple the bore to the conduit collection header. The vessel may have a reaction space for steam reforming of the hydrocarbon, wherein the reaction space is external to the tubular membrane and is on the retentate side of the tubular membrane, wherein the bore is a permeate side of the tubular membrane, and wherein the hydrogen to diffuse from the product gas through a wall of the tubular membrane to the bore. A conduit may provide nitrogen or steam as sweep gas to the bore. In implementations, an inner tube concentrically in the bore may facilitate flow of a sweep gas in the bore to displace hydrogen from the bore toward the conduit collection header. The inner tube may facilitate flow of the sweep gas to displace hydrogen in a direction countercurrent to flow of the hydrocarbon and steam into the vessel. Moreover, the vessel, reforming catalyst, multiple electrical heaters, and tubular membrane may be components of a catalytic membrane reactor. Lastly, electrical heaters (e.g., electrical band heaters) may be disposed on an outside surface of the wall of the vessel.

Yet another embodiment is a catalytic membrane reactor for hydrogen production. The reactor includes a vessel having an inlet to receive hydrocarbon, a reforming catalyst (e.g., nickel or nickel-based) in the vessel to convert the hydrocarbon into a product gas including hydrogen and carbon dioxide, multiple electrical resistive heaters (e.g., electrical cartridge heaters) to heat the reforming catalyst and to provide heat to fluid in the vessel, and multiple cylindrical membranes (e.g., each palladium or a palladium alloy) that are hydrogen selective to separate permeate that is primarily hydrogen from the product gas via the permeate diffusing through a wall of each cylindrical membrane to a bore of each cylindrical membrane. A region in the reactor vessel may be a reaction space for steam reforming the hydrocarbon, wherein the region is external to the multiple cylindrical membranes (e.g., tubular membranes), wherein the bore of each cylindrical membrane is a permeate side of the cylindrical membrane, and wherein the region external to the multiple cylindrical membranes is a retentate side of the multiple cylindrical membranes. The bore of each cylindrical membrane is coupled to a conduit collection header, and wherein the conduit collection header to receive permeate from each bore. In implementations, an inner tube concentrically in the bore of each cylindrical membrane may facilitate flow of sweep gas to displace permeate from the bore. The reactor may have electrical heaters disposed on the outside surface of the wall of the vessel to heat the vessel and to provide heat to fluid in the vessel. The electrical heaters on the outside surface may also heat the reforming catalyst including any reforming catalyst disposed on the inside surface of the wall of the vessel.

The reforming catalyst may be disposed on the multiple electrical resistive heaters in the vessel. The reforming catalyst may be disposed on an inside surface of the wall of the vessel. In implementations, the reforming catalyst does not contact the multiple cylindrical membranes. The reforming catalyst may be packed inside the vessel. If so, the reforming catalyst packed inside the vessel may contact the multiple cylindrical membranes. For any reforming catalyst packed inside the vessel, the packed reforming catalyst may include pelletized catalyst.

A number of implementations have been described. Nevertheless, it will be understood that various modifications may be made without departing from the spirit and scope of the disclosure.

What is claimed is:

1. A method of producing hydrogen, comprising:
   providing hydrocarbon and steam into a vessel to a region external to a hydrogen selective tubular membrane in the vessel, the hydrogen selective tubular membrane comprising multiple hydrogen selective tubular membrane units in the vessel, and each hydrogen selective tubular membrane unit is hydrogen selective and comprises a respective bore that is the permeate side of the respective hydrogen selective tubular membrane unit, with each pair of hydrogen selective tubular membrane units sharing a longitudinal axis that is aligned with a central axis of the vessel, with each hydrogen selective tubular membrane unit of a pair of hydrogen selective tubular membrane units comprising a capped end and positioned such that the capped ends of the hydrogen selective tubular membrane units of the pair of hydrogen selective tubular membrane units are adjacent;
   steam reforming the hydrocarbon in the vessel via reforming catalyst to generate hydrogen and carbon dioxide;
   diffusing the hydrogen through the hydrogen selective tubular membrane into a bore of the hydrogen selective tubular membrane; and
   providing heat for the steam reforming with electrical resistive heaters disposed in the vessel, the reforming catalyst disposed on the electrical resistive heaters and on an inside surface of a wall of the vessel.

2. The method of claim 1, comprising discharging the hydrogen from the bore as permeate to a conduit for collection of the hydrogen.

3. The method of claim 2, comprising discharging the carbon dioxide as retentate from the vessel.

4. The method of claim 3, wherein the permeate comprises at least 90 mole-percent hydrogen on a dry basis, and wherein the retentate comprises at least 90 mole-percent carbon dioxide on a dry basis.

5. The method of claim 1, wherein providing heat comprises heating the hydrocarbon via conduction and convection of heat from the electrical resistive heaters.

6. The method of claim 1, wherein the electrical resistive heaters comprise electrical cartridge heaters.

7. The method of claim 1, wherein the region external to the hydrogen selective tubular membrane is a reaction space in the vessel and is a retentate side of the hydrogen selective tubular membrane, the bore of the hydrogen selective tubular membrane is a permeate side of the hydrogen selective tubular membrane, and the reforming catalyst is not in contact with the hydrogen selective tubular membrane.

8. The method of claim 1, comprising:
   providing a sweep gas to the bore of the hydrogen selective tubular membrane;
   displacing the hydrogen from the bore with the sweep gas; and
   increasing driving force for hydrogen permeation through the hydrogen selective tubular membrane to the bore from the region external to the hydrogen selective tubular membrane via displacing the hydrogen from the bore with the sweep gas.

9. The method of claim 8, wherein the sweep gas in displacing the hydrogen flows in a countercurrent direction relative to flow of the hydrocarbon and the steam into the vessel.

10. The method of claim 1, comprising providing heat for the steam reforming via an electrical heater disposed on an outside surface of the wall of the vessel.

11. The method of claim 1, comprising heating, via a heat source external to the vessel, the wall of the vessel and the reforming catalyst disposed on the inside surface of the wall of the vessel.

12. The method of claim 11, wherein the heat source comprises an electrical heater disposed on an outside surface of the wall of the vessel.

13. The method of claim 2, wherein providing heat comprises heating, via the electrical resistive heaters, the reforming catalyst disposed on the electrical resistive heaters.

14. The method of claim 6, wherein providing heat comprises, heating via the electrical cartridge heaters the reforming catalyst disposed on the electrical cartridge heaters.

15. The method of claim 7, wherein the hydrocarbon comprises natural gas, methane, liquid petroleum gas (LPG), or a mixture of C1 to C10 hydrocarbons, or any combinations thereof.

16. The method of claim 9, wherein the sweep gas comprises steam or nitrogen.

17. The method of claim 1, wherein the vessel comprises a cylindrical pressure vessel.

18. The method of claim 4, comprising:
providing a sweep gas to the bore of the hydrogen selective tubular membrane;
displacing the hydrogen from the bore with the sweep gas; and
increasing driving force for hydrogen permeation through the hydrogen selective tubular membrane to the bore from the region external to the hydrogen selective tubular membrane via displacing the hydrogen from the bore with the sweep gas.

19. The method of claim 4, wherein the region external to the hydrogen selective tubular membrane is a reaction space in the vessel and is a retentate side of the hydrogen selective tubular membrane, the bore of the hydrogen selective tubular membrane is a permeate side of the hydrogen selective tubular membrane, the reforming catalyst is not in contact with the hydrogen selective tubular membrane, and the hydrocarbon comprises natural gas, methane, liquid petroleum gas (LPG), or a mixture of C1 to C10 hydrocarbons, or any combinations thereof.

20. The method of claim 2, comprising heating, via a heat source external to the vessel, the wall of the vessel and the reforming catalyst disposed on the inside surface of the wall of the vessel, the heat source comprising an electrical heater disposed on an outside surface of the wall of the vessel.

* * * * *